United States Patent
McKee et al.

(10) Patent No.: US 9,862,491 B2
(45) Date of Patent: Jan. 9, 2018

(54) MODULAR LAVATORY SYSTEM OPTIMIZED FOR NARROW BODY COMMERCIAL AIRCRAFT

(71) Applicant: B/E Aerospace, Inc., Wellington, FL (US)

(72) Inventors: Jefferey McKee, Duvall, WA (US); Trevor Skelly, Mercer Island, WA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/677,626

(22) Filed: Apr. 2, 2015

(65) Prior Publication Data

US 2015/0284085 A1 Oct. 8, 2015

Related U.S. Application Data

(60) Provisional application No. 61/976,342, filed on Apr. 7, 2014.

(51) Int. Cl.
*B64D 11/02* (2006.01)
*B64D 11/06* (2006.01)
*B64D 11/00* (2006.01)

(52) U.S. Cl.
CPC .......... *B64D 11/02* (2013.01); *B64D 11/0691* (2014.12); *B64D 2011/0046* (2013.01); *Y02T 50/46* (2013.01)

(58) Field of Classification Search
CPC .......................... B64D 11/02; B64D 2011/0046
USPC .............................................. 244/118.5, 118.6
See application file for complete search history.

(56) References Cited

U.S. PATENT DOCUMENTS

| 3,738,497 | A | | 6/1973 | Betts et al. | |
|---|---|---|---|---|---|
| 4,884,767 | A | * | 12/1989 | Shibata | B64D 11/02 105/315 |
| 5,150,863 | A | * | 9/1992 | Hozumi | B64D 11/00 244/118.5 |
| 6,079,669 | A | * | 6/2000 | Hanay | B64D 11/0691 244/118.5 |

(Continued)

FOREIGN PATENT DOCUMENTS

WO 2014014780 A2 1/2014

OTHER PUBLICATIONS

International Search Report, dated Jun. 29, 2015, 5 pages, from PCT/US2015/024573.

(Continued)

*Primary Examiner* — Brian M O'Hara
*Assistant Examiner* — Keith L Dixon
(74) *Attorney, Agent, or Firm* — Donna P. Suchy

(57) ABSTRACT

An optimized, multi-configuration cabin and lavatory arrangement for a single aisle aircraft that adds either another row of seating or increases cabin space without sacrificing performance or function of the existing components. The invention includes a space efficient lavatory that may incorporate various design configurations to meet the needs of airlines seeking to generate additional revenue. The configuration of the present invention uses a reduction in the lavatory floor plan with the option for a modular flex wall area to provide a customizable combination that gains extra cabin space for carriers that can be utilized for additional revenue streams.

18 Claims, 6 Drawing Sheets

(56) References Cited

U.S. PATENT DOCUMENTS

| | | | | |
|---|---|---|---|---|
| 6,182,926 | B1 * | 2/2001 | Moore | B64D 11/00 244/118.5 |
| 6,604,709 | B1 * | 8/2003 | Wentland | B64D 11/00 244/117 R |
| D487,137 | S * | 2/2004 | Itakura | D23/274 |
| 6,848,654 | B1 * | 2/2005 | Mills | B64D 11/00 105/314 |
| 6,889,936 | B1 * | 5/2005 | Pho | B64D 11/02 105/315 |
| D593,647 | S * | 6/2009 | Bock | D23/271 |
| 8,070,098 | B2 * | 12/2011 | Guering | B64C 1/06 244/118.5 |
| 8,109,469 | B2 * | 2/2012 | Breuer | B64D 11/02 244/118.5 |
| 8,590,838 | B2 * | 11/2013 | Cook | B64D 11/02 114/116 |
| 8,662,444 | B2 * | 3/2014 | Tappe | B64D 11/02 244/117 R |
| 8,720,827 | B2 * | 5/2014 | Boren | B64D 11/02 160/210 |
| 8,770,517 | B2 * | 7/2014 | Boren | B64D 11/02 105/315 |
| 8,925,862 | B2 * | 1/2015 | Ehlers | B64D 11/02 244/118.5 |
| 9,038,946 | B2 * | 5/2015 | Hawkins | B64D 11/02 244/118.1 |
| 2007/0228216 | A1 | 10/2007 | Wenstrom | |
| 2014/0091178 | A1 | 4/2014 | Grieve et al. | |
| 2014/0217239 | A1 | 8/2014 | Ehlers et al. | |
| 2014/0359934 | A1 * | 12/2014 | Schliwa | B64D 11/02 4/664 |
| 2015/0129718 | A1 | 5/2015 | Koyama | |

OTHER PUBLICATIONS apex editor's Blog, "Picture: Airbus markets new streamlined lavatory design for A320 narrowbodies", May 21, 2013. 1 page.
apex editor's Blog; "Japan's Yokohama "extremely disappointed" as Boeing picks B/E for 737 lavatories", Jan. 19, 2012. 2 pages.
apex editor's blog; "New aircraft lav sees B/E Aerospace flushed with success", Apr. 19, 2013. 1 page.
Eule, Alexander; "Why B/E Aerospace is Flying High", Barron's, Apr. 5, 2014. 1 page.
McCartney, Scott; "Airlines Lavs Shrink to Fit More Seats", The Middle Seat Terminal, Mar. 29, 2013. 3 pages.
McDonnell Douglas; DC-10 Customer Configuration Summary, Revised Oct. 1978. 177 pages. Reference pages APPX 1066, 1070, 1072, 1078, 1111, 1191.
U.S. Court of Appeals for the Federal Circuit; Case Nos. 2016-1496, 2016-1497; Decision dated Oct. 3, 2017. 19 pages.

* cited by examiner

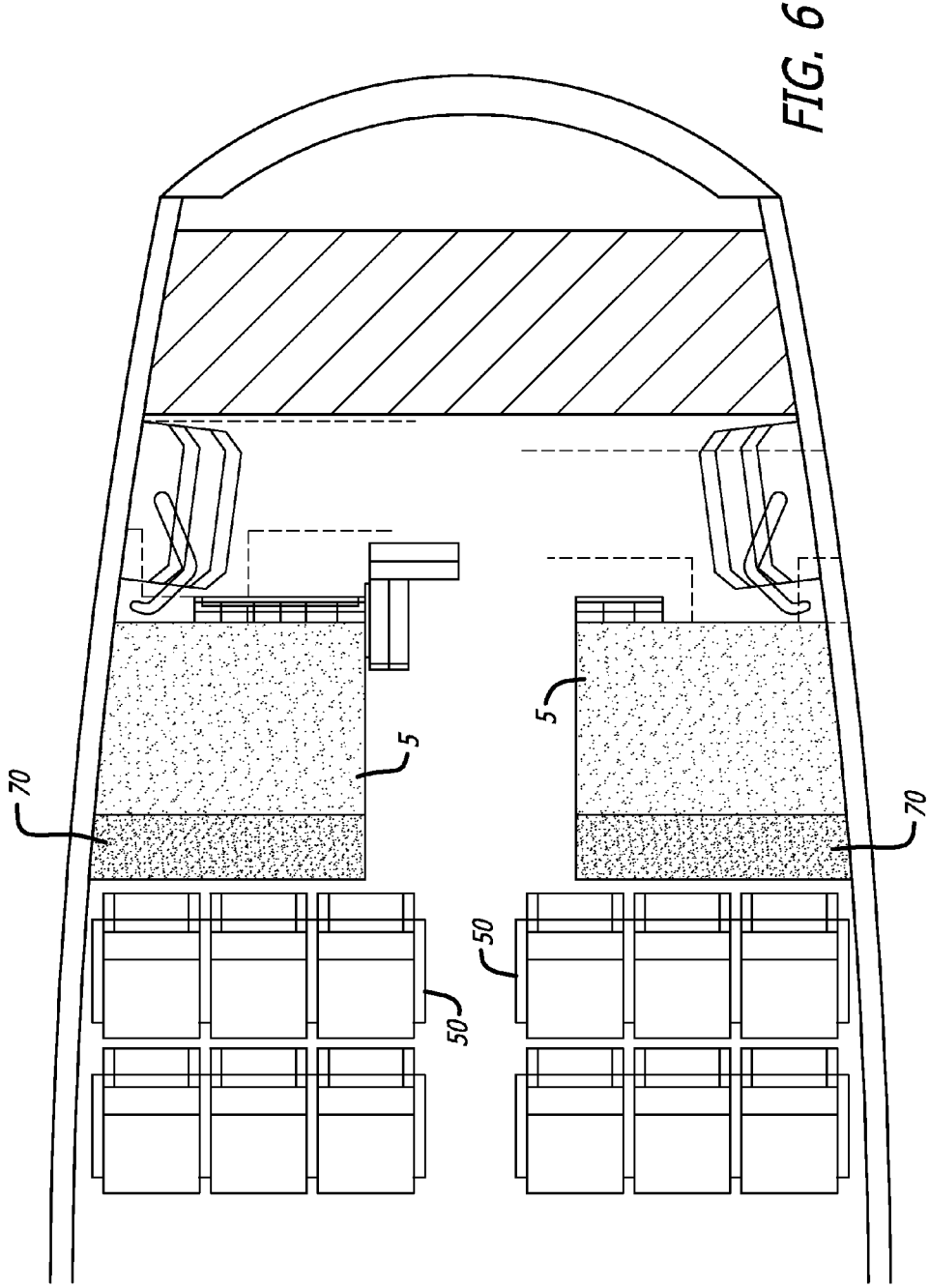

MODULAR LAVATORY SYSTEM OPTIMIZED FOR NARROW BODY COMMERCIAL AIRCRAFT

CROSS-REFERENCES TO RELATED APPLICATIONS

This application is based upon and claims priority from U.S. Provisional Application No. 61/976,342, filed on Apr. 7, 2014, incorporated by reference in its entirety herein.

BACKGROUND OF THE RELATED ART

It is the goal of all of those who design aircraft that space is optimized in every aspect of the aircraft's systems and functions. While all aircraft strive for efficiency and economy in its arrangement of components, this is particularly critical in commercial aircraft. Single aisle aircraft are especially stringent when it comes to the number of seats that can be accommodated, since each additional row of seats, or seats themselves, represents a higher percentage of profitability as compared with larger aircraft. However, the floor plans of these smaller aircraft are typically fixed by other constraints, thereby limiting the number of seats or cabin space available. Any arrangement that allows for additional space in the cabin represents a significant advance in aircraft design.

FIG. 1 illustrates a standard aircraft cabin arrangement for a single aisle aircraft, such as an Airbus A320 family of aircraft. As illustrated in the figure, the width of the lavatories 400 at the rear doors 405 establish a rearmost position of the last row of reclining passenger seats 410, that position being the forward edge of the lavatories 400 plus another six to eight inches for the seats to move back.

In today's commercial airline industry, operators prefer passenger cabin arrangements that maximize the number of seats available for passengers. Unfortunately, increasing the number of seats in an aircraft can reduce the amount of space available for lavatories and food service galleys 415. Accordingly, there is a need for a high passenger solution ("HPS") for the aft portion of a single-aisle aircraft like that shown in FIG. 1, which provides space for at least one additional row of passenger seats, or in the alternative provides additional galley/storage area. The present invention solves this problem and increases the cabin usable area with no loss of performance in any area of the aircraft's existing systems.

SUMMARY OF THE INVENTION

The present invention is an optimized, multi-configuration cabin and lavatory arrangement for a single aisle aircraft that adds either another row of seating or increases cabin space without sacrificing performance or function of the existing components. Optimizing the cabin space adds additional revenue opportunities to the aircraft owners. The invention includes a space efficient lavatory that may incorporate various design configurations to meet the needs of airlines seeking to generate additional revenue. The configuration of the present invention uses a reduction in the lavatory floor plan through a lavatory with a narrow base and widening upper portion, and with the option for a modular flex wall area to provide a customizable combination that gains extra cabin space for carriers that can be utilized for additional revenue streams (i.e., an additional row of seats or ancillary design solutions).

DESCRIPTION OF THE DRAWINGS

FIG. 4 is cut away front view of the lavatory of the present invention looking in;
FIG. 6 is a plan view of the single aisle aircraft with the flex wall installed.

DETAILED DESCRIPTION OF THE MAIN EMBODIMENTS

Figure 2:
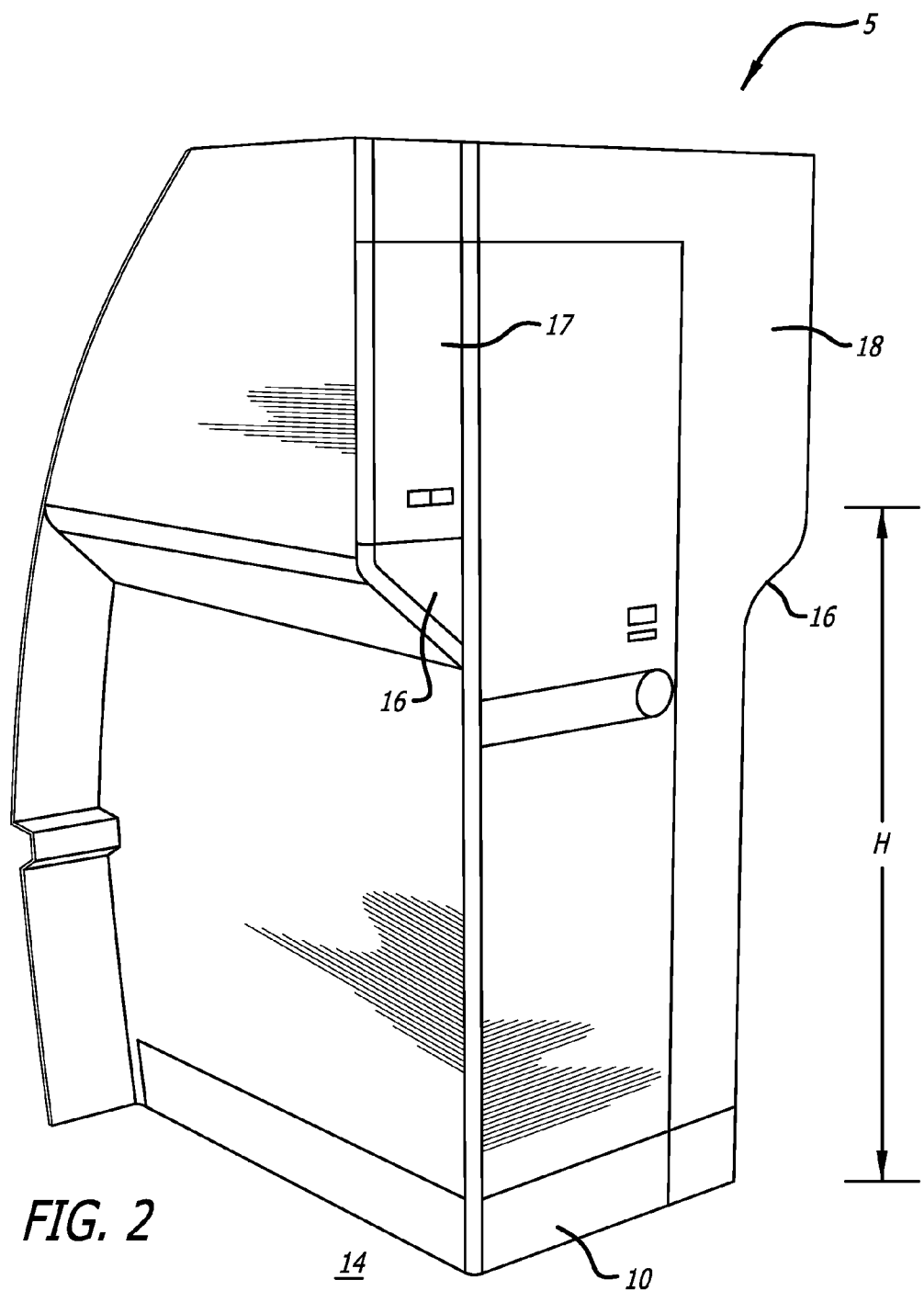
FIG. 2 is an elevated, perspective view of a first embodiment of a lavatory of the present invention.

FIG. 2 illustrates an elevated perspective view of a first preferred embodiment of a lavatory 5 of the present invention. As can be seen from the figure, the lavatory has a narrow base 10 and an expanded, broader upper section 18 beginning approximately at the midway point, forming a "Y" or slingshot shaped profile. The narrow, straight base 10 rises up from the floor 14 of the aircraft to an intermediate, widening area 16 as the lavatory expands in the lateral direction, establishing a top portion 18 that is significantly wider than the base 10. The height "H" of the widening area 16 is selected to allow an adjacent passenger seat to fully recline against the narrower base portion of the lavatory 5, which advantageously allows the seat to be moved closer to the lavatory creating space for possibly an additional row of seats or other revenue generating modes. Additionally, the expanded upper portion 18 of the lavatory provides additional storage space 17 in the form of a lockable cabinet, pull out drawer, or shelves for various supplies and/or equipment, and also the expanded upper portion of the lavatory provides the occupant more space at eye level.

Figure 3:
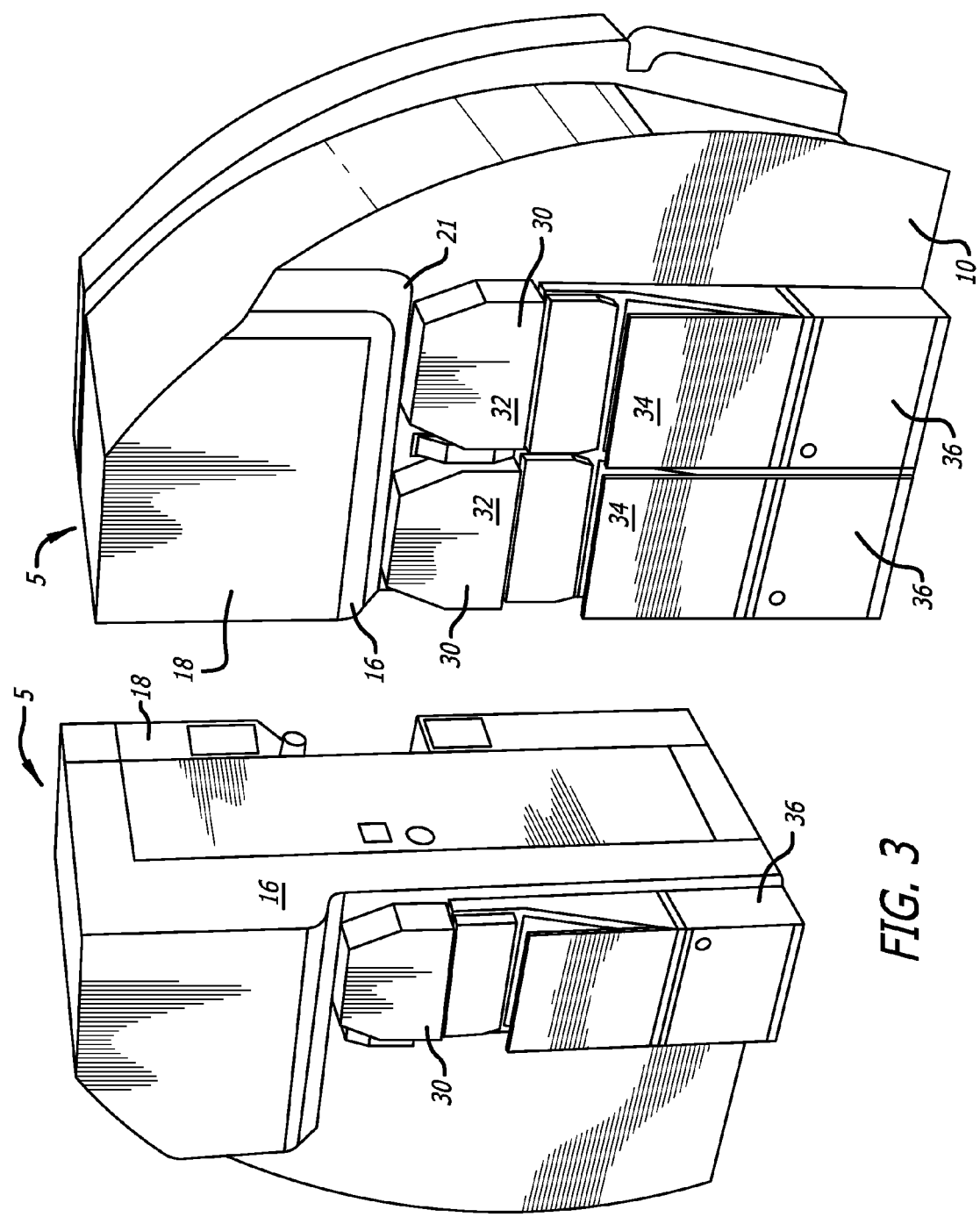
FIG. 3 is an elevated, perspective view of a second embodiment of the lavatory securing the flight attendant seating and storage area above.

FIG. 3 illustrates how the additional space created by the "Y" shaped profile of the lavatory 5 can be used to house and deploy a set of flight attendant cabin seats in the free space created by the new design. Where a pair of lavatories are situated across from each other in the aircraft as shown in FIG. 3, multiple fold-down flight attendant seats 30 having a headrest 32 and fold down seats 34, and can be arranged below the widening area 16 in the void of the contoured lavatory wall 21, virtually eliminating the footprint of the flight attendant seating when compared with existing lavatory designs. The widening area 16 of the lavatory 5 can be tailored to accommodate the flight attendant seats 30 exactly so that no wasted space is present, i.e., the flight attendant seats in the folded up position are completely under the expanded portion 18 of the lavatory 5. The flight attendant seats 34 can also include storage compartments 36 that can be used to store equipment or supplies. The expanded areas 18 above the widening area 16 can also be optimally used for storage 17 of lavatory or safety supplies, or otherwise used to house the belongings of the flight attendants.

Figure 4:
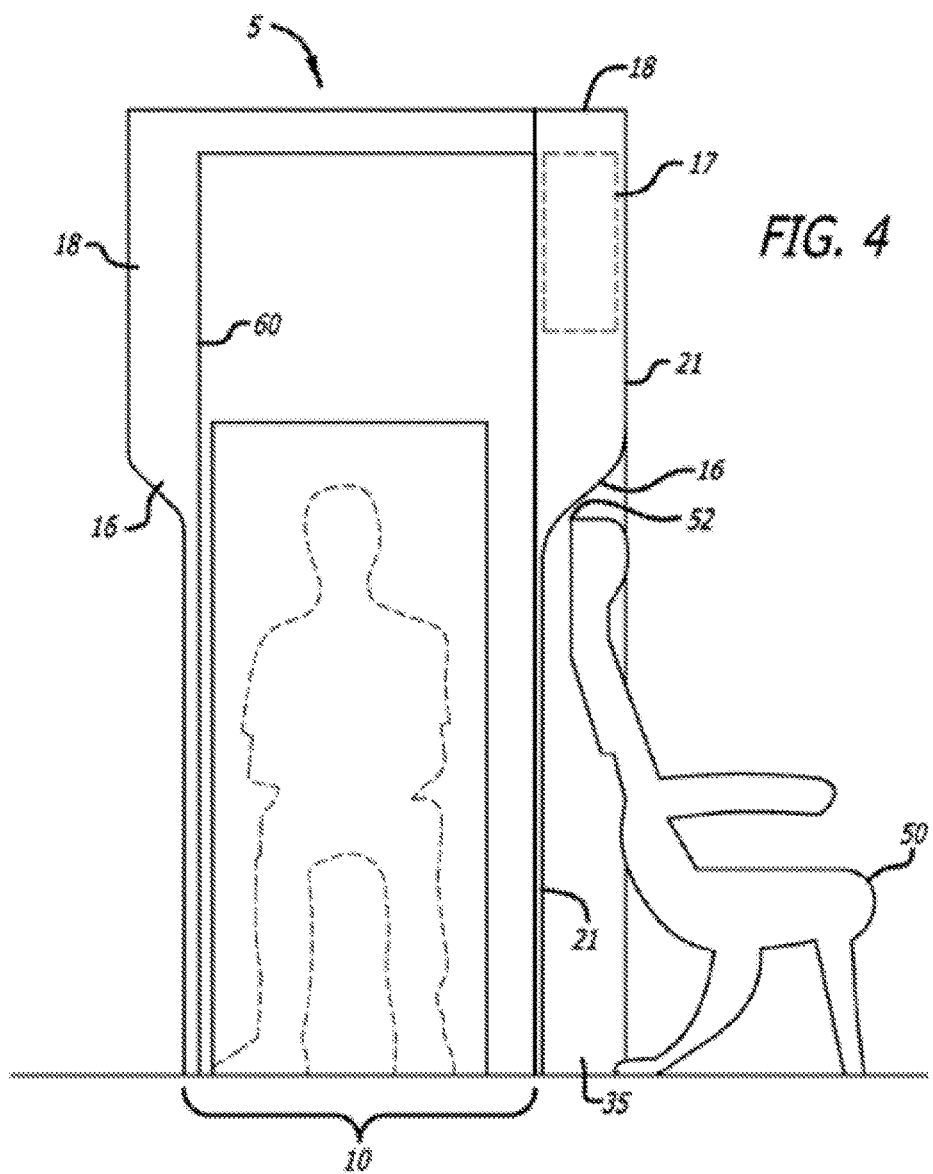

In an alternate embodiment, FIG. 4 illustrates how the improved lavatory design of the present invention can be used to increase the usable floor space of the aircraft by several inches by moving the last row of seats 50 rearward to extend into, at least partially, the void 35 formed in the side of the lavatory 5 by the contoured wall 21. In the new configuration, up to eight inches or more can be gained on one side of the lavatory 5 by repositioning the seats 50 to account for the void resulting from the narrowed base 10.

The contoured forward and aft walls 21 effectively reduce the foot print of the existing lavatories to create a space efficient lavatory, reducing in one example from 36" to 28" the position of the seat's closest point 52 to the door hinge 60 or opening. Furthermore, adding an extended sidewall integrated into the lavatory eliminates the need for additional linings and bins otherwise needed to make the modification.

The modular lavatory 5 includes the storage 17, which can be modularly replaced with revenue generating modes, such as vending machines, dispensers, storage lockers, blankets, and the like. The flexible wall 21 can also be completely removed in some embodiments to create more cabin space when other modes are not in use. The area can also be used for lavatory storage accessible inside the lavatory, such as shelves, driers, vending machines, etc.

Figure 5:
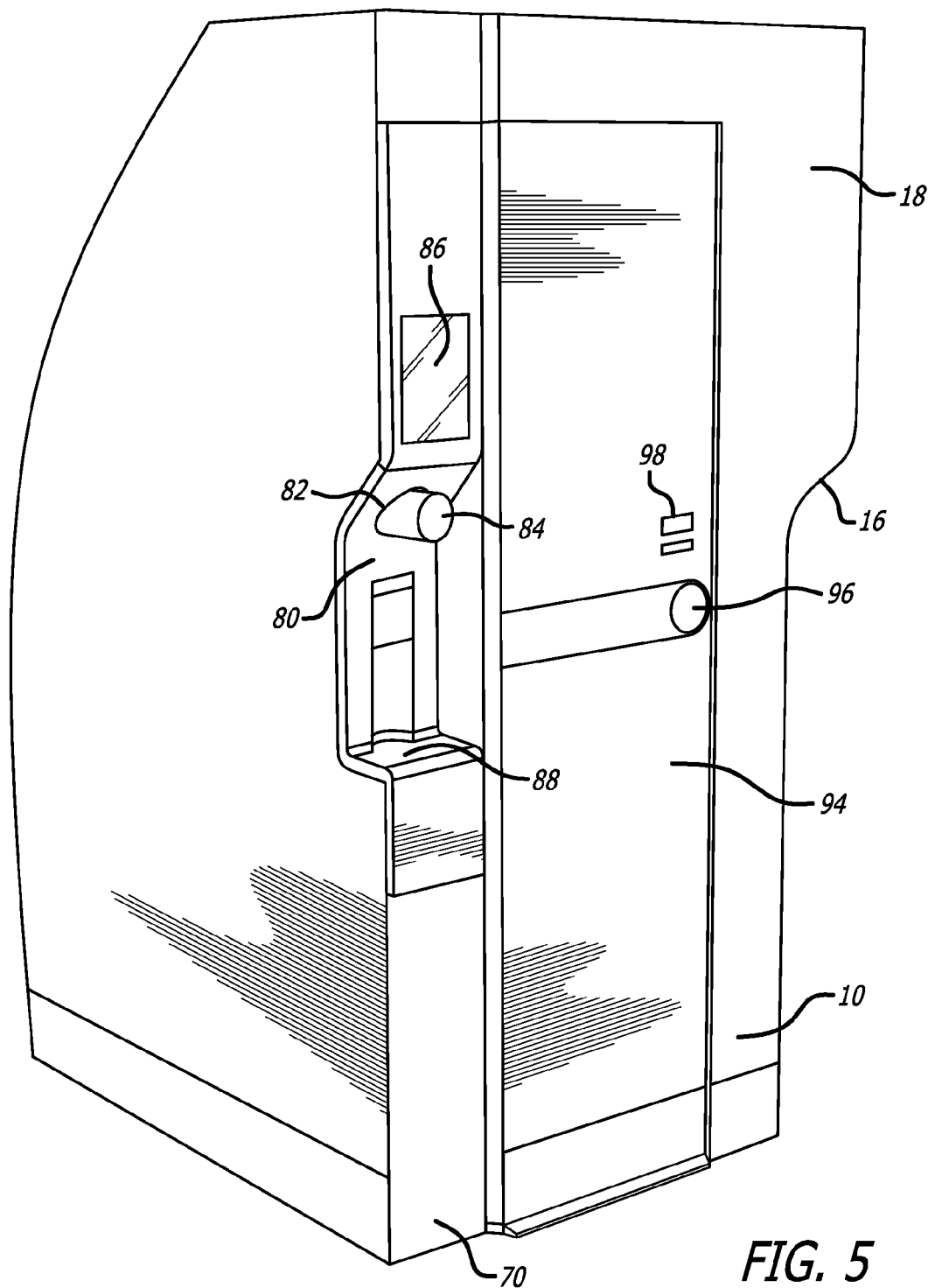
FIG. 5 is an elevated, perspective view of a flex wall adjacent the lavatory.

FIG. 5 illustrates the improved lavatory 5 with a flex wall 70 also incorporated into the configuration. In this modular lavatory system an interchangeable forward flex wall 70 allows flexibility for the airline operator to meet configuration needs. In this embodiment, the area can be used for:
  Added cabin storage;
  Contoured wall panel to add more space in the passenger cabin; and
  Opportunities to develop ancillary revenue units to fit in this space.

In the case of the latter example, FIG. 5 illustrates a drink dispenser 80 that is integrated into the flexible wall 70. The dispenser 80 may be a courtesy to passengers or a revenue generating dispenser, and other opportunities include a vending machines or passenger rental spaces to reserve additional personal belongs storage, or other amenities for which the airlines can offer to customers that also increase the airlines revenue. The dispenser 80 may include a cup holder 82 for holding disposable cups 84, a touch menu screen 86 for selecting beverages from among stored pressurized canisters (not shown) in the flex wall 70, and a dispensing area 88 for dispensing the beverage. The door 94, its handle/paddle 96, and occupied indicator 98 are unaffected by the presence of the flex wall 70 and the beverage dispenser 80.

There are many advantages of the present invention, including a turnkey value based product where plug and play quick installation is supported with little to no down time. The new design creates minimal impact to the overall cabin integration, and the lavatory walls can be sized to have a reduced unit footprint that integrates into existing cabin linings. The design further provides opportunities for new revenue generation through product placement, rental storage, or adding cabin space for additional premium economy seating. The flexible nature of the design is also an added feature, where the lavatory can be customized depending upon the needs of the aircraft and the existing structures (e.g., seat height, etc.). Yet another benefit of the present invention is a weight reduction achieved by the lavatory having less material leading to a reduced weight that will help offset a percentage of the increased passenger weight. The modular nature of the system leads to efficiencies in parts and storage, where interior parts support interchangeable parts. Finally, additional storage is created in the expanded areas of the lavatories, which can be used to house supplies or equipment.

Figure 1:
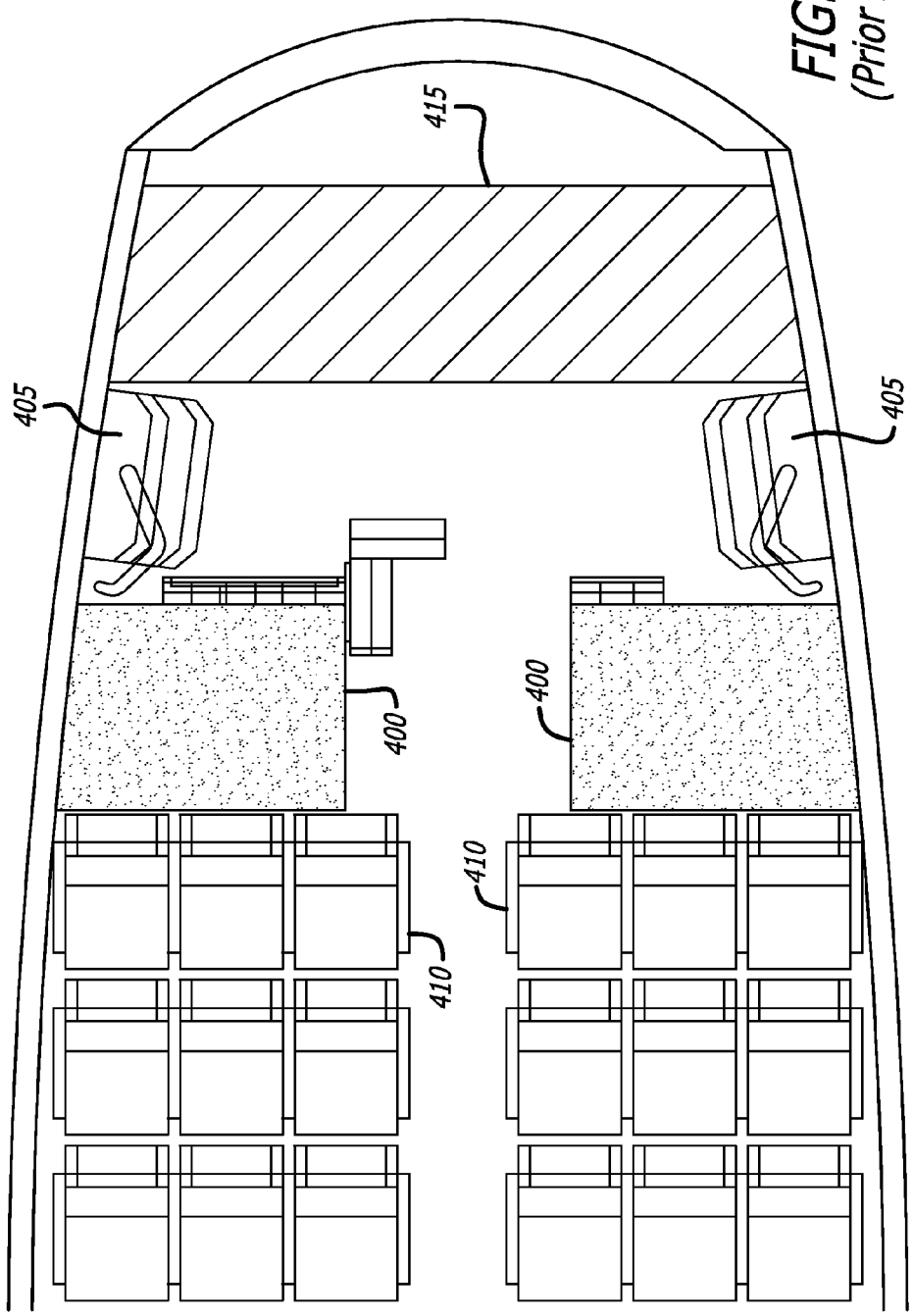
FIG. 1 is a plan view of a prior art single aisle aircraft.

FIG. 6 illustrates the plan view of the aircraft with the flex wall 70 installed adjacent the optimized lavatory. The flex wall 70 is removable and conformable to a variety of situations and needs of the customer. The layout illustrates the design reduction in the lavatory 5 with the flex wall 70 as compared with FIG. 1, while providing a customizable section to gain extra cabin space for carriers to utilize for additional revenue streams, e.g., additional row of seats 50 or ancillary design solutions.

These and other features and advantages of the invention will be apparent to a person of ordinary skill in the art from a reading of the above description and a review of the drawings. It will be apparent from the foregoing that while particular forms of the invention has been illustrated and described, various modifications and substitutions may be made to the embodiments described herein without departing from the spirit and scope of the invention. Accordingly, the present invention is not intended to be limited such foregoing descriptions and drawings, but rather that they be illustrative of the invention. The scope of the present invention is intended to include all such modifications and substitutions as would be recognized by one of ordinary skill in the art.

We claim:

1. A modular system for a cabin area of a commercial passenger aircraft, comprising:
  a lavatory module comprising a forward wall and an aft wall, each of the walls having an upper portion and a lower portion, wherein the aft wall is substantially flat, the upper portion of the forward wall extends along a first plane perpendicular to a longitudinal axis of the aircraft, and
  the lower portion of the forward wall extends along a second plane perpendicular to the longitudinal axis of the aircraft, such that the upper and lower portions of the forward wall define a void area between the first plane and the second plane and below the upper portion of the forward wall, the void area being configured to receive at least a portion of a seat and being situated outside of the lavatory module: and
  a modular unit comprising a forward wall and an aft wall the forward wall of the modular unit abutting the upper portion of the aft wall of the lavatory module and extending downwardly from the top of the aft wall of the lavatory module.

2. The system of claim 1, wherein the seat is a flight attendant fold down seat, wherein the seat in a retracted position is substantially contained between the first plane and the second plane.

3. The system of claim 1, wherein the modular unit comprises a removable drink dispenser.

4. The system of claim 1, wherein the seat comprises at least a seat back configured to extend between the first plane and the second plane when in an unreclined position.

5. The system of claim 1, wherein the modular unit includes a vending machine.

6. The system of claim 1, wherein an interior region aft of the upper portion of the forward wall comprises a storage locker.

7. The system of claim 1, further comprising a lavatory storage region at least partially disposed between the first plane and the second plane, wherein the lavatory storage region is accessible from inside the modular lavatory.

8. The system of claim 1, wherein the modular unit is a passenger rental storage space.

9. The system of claim 8, further comprising a flight attendant seat installed on the aft wall, wherein the flight attendant seat is positioned under the modular unit such that the flight attendant seat, when in a stowed position, is entirely contained with the region extending from aft wall to a third plane along which an aft portion of the modular unit extends.

10. The system of claim 9, further comprising a storage compartment disposed below the flight attendant seat.

11. A method for optimizing use of space in a cabin area of a single aisle commercial aircraft with a modular lavatory system, comprising:
  installing a lavatory module of the modular lavatory system, the lavatory module comprising
    a first side wall disposed on a first side of the lavatory module, the first side wall including a lower portion and an upper portion, wherein the upper portion is wider in a dimension parallel to a longitudinal axis of the commercial passenger aircraft than the lower portion, such that
      the upper portion extends along a first plane parallel to a latitudinal axis of the commercial passenger aircraft, and
      the lower portion extends along a second plane parallel to the latitudinal axis of the commercial passenger aircraft,
      wherein a void area between the first plane and the second plane is configured to accommodate at least a portion of a seat, the void area being situated outside of the lavatory module, and
    a modular wall disposed on a second side of the lavatory module, the modular wall being configured to abut a selected module of at least two interchangeable modules; and
  installing a first module of the at least two interchangeable modules, the first module including a forward wall and an aft wall, wherein, upon installation, the forward wall of the first module abuts the modular wall of the lavatory module, such that in combination, the lavatory module and the first module integrate into an existing cabin lining space sized for a preexisting standard lavatory.

12. The method of claim 11, wherein the seat is a flight attendant seat mounted beneath the upper portion such that the flight attendant seat in a folded position is substantially contained between the first plane and the second plane.

13. The method of claim 11, wherein a first module of the at least two interchangeable modules is a full-height module, and a second module of the at least two interchangeable modules is a partial height module, wherein the partial height module is configured to mount proximate a ceiling of a cabin area of the passenger aircraft.

14. The method of claim 11, wherein the selected module comprises a vending machine.

15. A method for retrofitting a cabin area of a single aisle commercial aircraft with a modular lavatory system, comprising:
  replacing a preexisting lavatory with a modular lavatory compartment, wherein the modular lavatory compartment comprises a first side wall including an upper portion and a lower portion, wherein the upper portion is wider in a dimension parallel to a longitudinal axis of the commercial passenger aircraft than the lower portion, such that
    the upper portion extends along a first plane parallel to a latitudinal axis of the commercial passenger aircraft, and
    the lower portion extends along a second plane parallel to the latitudinal axis of the commercial passenger aircraft,
    wherein a void area between the first plane and the second plane is configured to accommodate at least a portion of a passenger seat;
  repositioning the passenger seat rearward toward the modular lavatory compartment, such that the top portion extends above a height of a headrest of the at least one passenger seat, and a portion of a seat back of the passenger seat extends between the first plane and the second plane when the passenger seat is in a reclined position; and
  installing, proximate a rearward wall of the modular lavatory compartment, a selected module of at least two interchangeable plug-and-play modules, the selected module having a forward wall and an aft wall, the forward wall abutting the upper portion of the first side wall of the modular lavatory compartment;
  wherein, upon installation, the modular lavatory compartment combined with the selected module substantially conforms to a footprint of the preexisting lavatory.

16. The method of claim 15, wherein a combined weight of the modular lavatory compartment and the selected module is less than a weight of the preexisting lavatory.

17. The method of claim 15, wherein repositioning the at least one passenger seat comprises moving the at least one passenger seat rearwardly within the cabin area by at least 6 inches.

18. The method of claim 15, wherein the at least two interchangeable plug-and-play modules are designed for interchangeable installation with little to no downtime for the passenger aircraft.

* * * * *